United States Patent [19]

Gore et al.

[11] 4,292,215

[45] Sep. 29, 1981

[54] AMINO MOLDING COMPOUND FOR COLD MANIFOLD INJECTION MOLDING

[75] Inventors: Donald B. Gore, Swanton; Ronald S. Krigbaum, Toledo; James O. Peterson, Sylvania, all of Ohio

[73] Assignee: Plaskon Products, Inc., Toledo, Ohio

[21] Appl. No.: 26,974

[22] Filed: Apr. 4, 1979

[51] Int. Cl.$^3$ ............................................. C08L 1/00
[52] U.S. Cl. ................................ 260/17.3; 264/328.6; 264/328.18
[58] Field of Search .................... 260/17.3; 264/328.6, 264/328.18

[56] References Cited

U.S. PATENT DOCUMENTS

| | | | |
|---|---|---|---|
| 2,841,565 | 7/1958 | Bornstein | 260/17.3 |
| 3,230,187 | 1/1966 | Oldham | 260/6 |
| 3,320,192 | 5/1967 | Ostrowicz | 260/17.3 |
| 3,650,821 | 3/1972 | Meiser | 260/29.4 |
| 3,681,274 | 8/1972 | Oetgen et al. | 260/17.3 R |

*Primary Examiner*—James H. Derrington

[57] ABSTRACT

A urea-formaldehyde corn is mixed or ground with added paraformaldehyde and urea in addition to a catalyst system and other conventional additives to produce a mixture of fine powder. This mixture is optionally densified and granulated. The addition of urea and paraformaldehyde to the corn causes a low viscosity under cold manifold injection condition, which is particularly suited for cold manifold molding applications. The condensation of resin in the corn is preferably kept low by using high formaldehyde: urea ratios and pH values during drying. The plastic life of the molding compound is improved by employing a catalyst system such as zinc sulfate and hexamethylenetetramine. The molding compound is stable at about 82°–110° C. for over about 5 minutes and can be injected at applied pressures of below about 125 megapascals (18,000 psi) at such manifold temperatures with reasonable cycle times and without setting in the sprue or runners.

10 Claims, No Drawings

AMINO MOLDING COMPOUND FOR COLD MANIFOLD INJECTION MOLDING

BACKGROUND OF THE INVENTION

Thermosetting urea molding compounds are conventionally prepared by impregnating a cellulosic filler such as alpha cellulose with a mixture of urea and formaldehyde or a urea-formaldehyde condensate or a urea-formaldehyde prepolymer or resin. The impregnated material may be then dried under conditions that increase the condensation of the resin to produce a fluffy material commonly referred to as "corn." The corn is then mixed or ground in combination with curing catalysts and normally pigments and sometimes plasticizers to form a mixture or powder. Lubricants may be added before or after drying. The mixture or powder is either used as such or, if a powder, more commonly densified by various techniques to form a granular product. An overview of such a process is given in Modern Plastics Encyclopedia, Vol. 45, No. 14A, pp 157,176 (October 1968). Alternatively, the mixture may be fed directly to an extruder or the like to form a granular material.

A common application of such filled urea molding compounds is in injection molding, particularly of electrical parts such as receptacles, sockets, switch parts and circuit breakers. In the normal injection molding process, the granular molding compound is rammed as a shot through a sprue and runners and through gates into a plurality of mold cavities. The mold cavities are subjected to sufficient heat and pressure to set the urea molding compound into the desired articles. Since the spure and runners are in thermal communication with the mold cavities, the molding compound in the sprue and runners also sets during the normal mold cycle. When the mold is opened, material from the mold cavities, the runners and the sprue must be ejected, with the sprue and runner material representing substantial waste of molding compound.

A "cold manifold" injection molding process has been developed for thermosetting materials such as phenolics wherein the manifold is kept from heating to the temperature where materials cure. Thus, only the molded articles and relatively short runner pieces need be ejected, with the remainder of the material in the sprue and runners forming a portion of the subsequent shot.

Exemplary equipment for such processes and an overview of the processes themselves are contained in U.S. Pat. No. 3,374,502 to Lazzara (issued Mar. 26, 1968), an article entitled "Cold-Manifold Molding Gains Adherents-Slowly" in the August 1977 issue of *Plastics Technology* on pages 55 and 56, an article entitled "Molders Speak Out On Cold-Manifold Molding" in the December 1977 issue of *Plastics Technology* on pages 55–59 and Pennwalt Corporation (Stokes Division) "Cold Runner Manifold," *Plastics World* 35–36 (September 1977). While such a cold manifold injection molding system has been suggested for urea molding compounds, a satisfactory urea molding compound for such use is not available. It should be recognized that very high molding temperatures are used to cure phenolic molding compounds, allowing the use of higher manifold temperatures than for urea molding compounds to achieve a satisfactory injection viscosity without experiencing setting or curing in the manifold. This permits the wide temperature difference between mold cavity temperature and manifold temperature thus facilitating the successful molding of phenolic materials in a "cold manifold" injection molding process.

The difficulties are that conventional urea molding compounds will set quickly in the sprue and runners at the temperatures required to inject or move the material through the manifold and runners. Such setting is particularly likely to occur if, because of operational problems, material remains in the runners for a time equivalent to several cycles. In attempting to vary urea molding compound compositions to avoid setting in the runners, the rate at which the compound sets or cures in the mold cavity may also increase such that cycle times must be substantially increased. Furthermore, with some other modifications in the formulation including sufficient catalyst to achieve reasonable cycle times, a satisfactory initial injection viscosity of the material can be achieved, but subsequent viscosity increases in the manifold cause injection difficulties.

It is accordingly an object of this invention to provide a urea molding compound that can be maintained at cold manifold temperatures in the range of about 180° F. to 230° F. (about 82° C. to 110° C.) without setting or curing for several minutes, and without excessive viscosity under injection conditions or unreasonably long molding cycle times and that can be prepared or manufactured by conventional methods without substantial cost penalty.

BRIEF DESCRIPTION OF THE INVENTION

The present invention includes an improvement in a method of forming a urea molding compound of a type wherein a cellulosic filler is impregnated with an aqueous urea-formaldehyde prepolymer or resin or condensate or a monomer mixture of urea and formaldehyde monomers, the impregnated material is dried to form a corn and the corn is mixed or ground in combination with a lubricant and a curing catalyst into a powder. In the improvement, urea and paraformaldehyde are combined with the corn before or during mixing or grinding in quantities sufficient to lower the viscosity of the molding compound to a viscosity where the molding compound can be injected at an injection temperature of about 82° to 110° C. with an applied pressure of about 125 megapascals or less. Thereby the molding compound can be used in injection molding operations having a manifold temperature of about 82° to about 110° C. without setting in a substantial portion of the sprue or runners.

The present invention also includes a urea molding compound so prepared, particularly when subsequently granulated.

The present invention also includes a process of injection molding of the cold manifold type wherein a urea molding compound prepared by the above method is used.

DETAILED DESCRIPTION OF THE INVENTION

The corn used in the present process is prepared from urea, formaldehyde and a cellulosic filler such as alpha cellulose. Urea and formaldehyde may be impregnated on the filler as monomers in aqueous solutions or otherwise, as urea-formaldehyde concentrates as a prepolymer or resin or in any other conventional form. The formaldehyde may be in the form of paraformaldehyde (homopolymers of formaldehyde), but this is not required for the material used to impregnate the filler.

The molar ratio of formaldehyde to urea in the corn is between about 1.0:1 and about 2.0:1 and preferably between about 1.50:1 and about 1.60:1. This preferred proportion is somewhat higher than for normal urea molding compounds used in standard injection molding processes. Similarly, the wet corn is kept at a pH of about 6.0 to 8.0, preferably about 7.2 to 7.5 rather than the standard conditions of about 6.0 to 6.9. The preferred pH is designed to limit the degree of condensation during drying. In other respects the corn is prepared in a conventional fashion. Thus the mixer is fed with resin (or monomers), filler and other additives such as lubricants and a base to adjust the pH. Expressed as a percentage of the total composition, the filler is between about 20 and 40%, preferably between about 25 and 34%. Lubricants such as glycerol monostearate and/or zinc stearate may be used at, for example, 0.1 to 2%. A 20% aqueous triethanolamine solution may be used to adjust the pH to the desired level for drying, but other conventional bases (or acids if needed) can be used.

The drying conditions are preferably between about 180° and 220° F. (about 82° to 105° C.), usually on a continuous belt system. Higher temperatures are less preferred because they promote excessive condensation of the resin. Dried material is cut or chopped to facilitate handling.

The corn is ground with curing catalyst, pigments (usually), other lubricants (optionally), stabilizers, paraformaldehyde and urea in a ball mill, tube mill, attrition mill or other grinding apparatus under conditions that produce a well-mixed fine powder but do not promote the further condensation of the resin. Alternatively, these ingredients may be mixed without grinding in various apparatus or even in the densification step with devices such as a Banbury mixer or an extruder.

The product of the grinding step, normally a fine powder, may be used as such for some applications, but is preferably densified and preferably then or simultaneously granulated in order to be easily delivered by a feed screw. Suitable apparatus for the densification step include Banbury mixers, combining mill rolls or preformers and extruders.

In the grinding step, additives to the corn (based on weight of corn) are urea, paraformaldehyde and catalyst and (optionally) further lubricants and pigments. The amount of catalyst will, as is conventional, be sufficient to cause complete setting of the molding compound under molding conditions. For conventional stabilizer-catalyst system such as carboxylic acid anhydride-hexamethylenetetramine, amounts of about 0.05% to 2% of each are generally sufficient. For the present invention, catalyst systems of an acid salt such as zinc sulfate and a polyamine such as hexamethylenetetramine are preferred since they exhibit better "latency" (low catalytic activity at manifold temperatures).

Examples of other suitable acid salts are ammonium sulfate, tertiary amine sulfates, barium sulfate, aluminum sulfate and magnesium bromide. Zinc sulfate is preferred with hexamethylenetetramine. Suitable proportions generally include about 0.2 to 2% zinc sulfate and about 0.2 to 2% hexamethylenetetramine, with the desired result being an overall injection molding cycle of approximately ninety seconds or less and preferably one minute or less.

Paraformaldehyde in powdered form is preferred in the grinding or mixing step rather than flake form which did not grind or disperse as well in experimental equipment. For other equipment the flake form may be entirely satisfactory. Paraformaldehyde alone (without urea) does not lower the viscosity of the material under injection conditions as much as does the combination of paraformaldehyde and urea. Furthermore, paraformaldehyde alone can cause excessive gas formation in the mold. Only paraformaldehyde (formaldehyde homopolymers) and similar substantially anhydrous forms of formaldehyde are suitable for use in the mixing or grinding step.

Urea is also provided to the grinding or mixing step in a water-free state such as crystalline urea or prilled urea. Urea alone (without paraformaldehyde), when added to the grinding step in a quantity equivalent to that used for both ingredients in the present process, would lower the viscosity of the material at injection conditions (as shown in the Examples that follow, particularly Example 1) as much as the combination (compare Example 2); however, such large amounts of urea alone cause the product of the grinding step to lump severely, making its use impractical in conventional equipment for further manufacturing steps.

Levels of urea and paraformaldehyde are such as to lower the filler content of the molding compound to between about 25% and about 34% by weight, since strength properties of the molded compound will deteriorate with decreasing filler content below about 25%. The urea and paraformaldehyde provided to the grinding step preferably have a separate formaldehyde:urea mol ratio between about 1.1:1 and about 2.0:1, more preferably between about 1.2:1 and about 1.3:1. Within these guidelines the paraformaldehyde is between about 2% and 6% (as a weight percent of corn), and the urea is between about 3% and 8% (as a weight percent of corn).

It will be appreciated that a lower filler material can be made directly from resin and filler without adding the urea and paraformaldehyde in the mixing grinding step. But processing of such a material in conventional, air flow-through type dryers becomes much more difficult when filler is removed making a much less porous bed of material on the perforated dryer belt. Condensation and moisture control of the dryer product are greatly encumbered making commercial corn production at the lower filler levels undesirable.

It was found that when the paraformaldehyde and urea were used in combination as described above, no deleterious effects were encountered in the grinding step or subsequent processing steps, but these additives did produce the desired effect of providing a molding compound that could be processed at a low temperature as described in the Examples that follow in an injection molding press and at realistic injection pressures. Furthermore, these additives gave an injection molding compound with setting or curing characteristics that gave realistic injection molding cycles, while still providing long manifold life equivalent to three or more cycles.

In determining whether a molding compound is satisfactory one may use the compound in a cold manifold injection molding system at a manifold temperature of about 82°-110° C. and measure the applied injection force on the molding compound required to inject the material into the mold cavities. An applied force of below about 18,000 psi (about 125 megapascals) or less is satisfactory and an applied force between 10,000 and about 15,000 psi (about 70-100 megapascals) is preferred. If the required injection force exceeds about 125 megapascals, then an insufficient amount of urea and/or paraformaldehyde has been added before or during the mixing or grinding step and additional urea and/or paraformaldehyde should be added.

It will be appreciated that the product of such a process differs chemically and physically from molding compounds in which all of the urea and formaldehyde are added prior to or during drying. It will be further appreciated that the unreacted urea and paraformaldehyde contained in the ground corn can react at the shot preparation conditions of the cold manifold process and will become part of the resin fraction of the finished, molded article. It is believed that one or more of the paraformaldehyde, the urea, the condensate formed therefrom and the water formed in this reaction plasticize the mass and aid in providing the desired viscosity at injection conditions and, as such, act as reactive plasticizers.

This urea molding compound may be injection molded in a conventional manner on a "cold manifold" system (as used for phenolics). The feed screw is of a conventional type for injecting thermosets, as illustrated for example on page 310 of Modern Plastic Encyclopedia, Vol. 55, No. 10A (October 1978). This screw plasticizes the material in a heated barrel and feeds successive charges of molding compound from a hopper to the sprue and then into the runners of the mold. These runners and sprue in a "cold manifold" system are subjected to a temperature of about 82° to about 110° C. frequently about 93.3° C. (200° F.). Molding compound is in the runners during normal operations only for a single cycle (30 seconds–90 seconds) but may be retained for the equivalent of several cycles (up to about 5 minutes) in case of minor breakdowns. In order to avoid setting of the compound in the runners or sprue, the present urea molding compounds should be capable of withstanding about 200° F. for about 5 minutes or longer without setting, with the exact requirements depending upon the expected manifold temperature and cycle time.

EXAMPLES

Two identical batches of resin was prepared from the ingredients shown in the following table:

TABLE 1

| | |
|---|---|
| Formaldehyde[1] | 3000 gms |
| Urea[2] | 2026 gms |
| Hexamethylenetetramine | 38 gms |
| Water | 215 gms |
| Lactic Acid[3] | 2.3 milliliters |
| Mol ratio[4] | 1.54:1 |

[1]52% formaldehyde solution in water with methanol,
[2]Prilled urea.
[3]20% aqueous lactic acid solution calculated to supplement measured formic acid of formaldehyde solution to give an equivalent formic acid level of 0.03%.
[4]Molar ratio of formaldehyde to urea.

The resin was allowed to condense at 55° to 60° C. for 65 minutes or until 1.35 mols of formaldehyde had reacted, as measured by the percent free formaldehyde. In particular, a weighed sample of the resin in water (adjusted to ph 8.6 according to a thymol blue indicator) was mixed and reacted with about one fourth the volume of a 20% aqueous sodium sulfite (also adjusted to pH 8.6 according to a thymol blue indicator). After 40 seconds reaction time, the mixture was titrated back to pH 8.6 with one normal HCl with the moles of NaOH neutralized stoichiometrically related to the moles of free formaldehyde in the original sample.

The resin was then mixed on a batch basis with alpha-cellulose pulp and other ingredients as shown in Table 2. The alpha-cellulose pulp was of a cotton-like consistency, having been prepared by Hammer-Milling roll-form pulp. The pulp contained about 7% free moisture.

Each resin-filler mixture was then dried at the indicated temperature until the moisture was 2.5% or less.

TABLE 2

| Resin Run No. | A | B |
|---|---|---|
| Pulp (gms) | 1140 | 1140 |
| Resin (gms) | 4990 | 4490 |
| Triethanolamine (20% solution) (mL) | 4 | 4 |
| Glycerol monostearate | 0 | 41 |
| TOTAL (gms) | 6134 | 6138 |
| Wet Corn pH | 7.5 | 7.5 |
| Mix time (minutes) | 10 | 10 |
| Drying Temperature (°F.) | 190 | 193 |
| Drying Time (minutes) | 65 | 80 |
| Weight % Water | 2.50 | 1.68 |

EXAMPLES 1–4

Corn from the above two runs were ground in laboratory Ball Mills for 4 hours along with other chemicals according to the formulations as given in Table 3. Product from the Ball Mills was then screened through a U.S. No. 40 sieve and the through-screen portion was tested as indicated in Table 4.

TABLE 3

| Example No. | C1 | 2 | C3 | C4 |
|---|---|---|---|---|
| Corn From Run No. | A | B | A | B |
| Paraformaldehyde[1] | 0% | 2.5% | 0% | 0% |
| Urea[1] | 6.5% | 3.9% | 0% | 0% |
| Zinc Stearate[1] | 0.3% | 0.2% | 0.2% | 0.2% |
| Hexamethylenetetramine[1] | 0.1% | 0.1% | 0.1% | 0.1% |

[1]Quantities given in weight percents based on the weight of corn used in the Ball Mill.

TABLE 4

| Example No. | C1 | 2 | C3 | C4 |
|---|---|---|---|---|
| ASTM Flow[1] | 12.8 | 9.1 | 11.3 | 11 |
| Minimum Torque[2] | 2350 | 1775 | 3110 | 2200 |
| Total Processing Time[3] | 7.9 | 13.0 | 6.35 | 10.9 |
| Plastic Life[4] (in inches) | | | | |
| 0 min. at 240° F. (115.6° C.) | 24 | 32 | 23 | 23 |
| 5 min. at 240° F. | 23 | 28 | 19 | 20 |
| 10 min. at 240° F. | 21 | 24 | 17 | 14 |
| 15 min. at 240° F. | 9 | 22 | 8 | 13 |
| Hardness[5] | 43 | 13 | 35 | 14 |
| % Product Retained on | | | | |

TABLE 4-continued

| Example No. | C1 | 2 | C3 | C4 |
| --- | --- | --- | --- | --- |
| U.S. No. 40 Sieve | NS | 1.3% | 0.34% | NIL |

NS = Not screenable (bad lumping)
[1]The ASTM cup flow was run at 2.5 Tons force, 310° F. mold temperature.
[2]Minimum torque is expressed in meter-grams. Values obtained from tests using a Brabender Plasticorder with a No. 6 roller head with a 90 gram sample, at 33 RPM and 240° F. The torque value fell to this minimum and then rose to 3500 meter-grams.
[3]Expressed in minutes to reach 3500 meter-grams whereupon the test was terminated. The torque would be expected to continue rising as the molding compound set.
[4]Values are expressed in inches and represent inches of spiral obtained from a Mesa spiral using a 22 gram sample, 310° F. temperature and 1648 psia transfer pressure. This Mesa Spiral test is more fully disclosed in "Spiral Mold For Thermosets" by Felix C. Karas on pages 140 and 142 of the September 1963 issue of Modern Plastics. Samples as preforms were preheated to the temperature indicated and then held in an oven at the indicated temperature. This test simulates holding material in the manifold of a cold-manifold injection system. Because, however, of the pressures found in actual manifold conditions, satisfactory times for this test may correspond to shorter times for the same material at the same temperature under actual manifold conditions. A spiral of 20 inches after 5 minutes at 240° F. represents a good result.
[5]Values are Shore D hardness values, run on a molded piece after 60 seconds at 300° F. with the sample preheated to 250° F. This is a measure of the degree of cure necessary to form a part rigid enough for ejection from a mold. A value of 50 minimum is desired.

It should be recognized from this information that the material identified as Example 2 gave the lowest viscosity material with the longest manifold life, while the material of Comparative Example 1 represents a material that would be difficult to process in conventional equipment because of the severe lumping.

EXAMPLES 5-14

A larger quantity of corn was processed in semi-works equipment according to the resin formulation given in Table 5 and the corn formulation given in Table 6.

TABLE 5

| Formaldehyde[1] | 129 pounds (48 kg) |
| --- | --- |
| Urea[1] | 87 pounds (32 kg) |
| Hexamethylenetetramine[1] | 745 grams |
| Water[1] | 9 pounds (3.4 kg) |
| Lactic Acid, 20%[1] | 54 milliliters |

[1]Materials as specified in Table 1.

TABLE 6

| Resin, from Table 5 | 37.6 | pounds (14 kg) |
| --- | --- | --- |
| Pulp (7% moisture) | 8.6 | pounds (3.2 kg) |
| Triethanolamine, 20% | 14 | milliliters |
| Glycerol Monostearate | 145 | grams |

The resin as formulated in Table 5 was reacted at 57° C.±1° C. until 1.36 mols of formaldehyde per mol of urea was consumed as determined by measuring the percent free formaldehyde. This resin was then mixed in a mixer with other ingredients as given in Table 6. Sufficient organic base was added to adjust the pH of the wet mix to 7.2 to 7.5. The mixed material was dried on a continuous belt dryer at 190° to 200° F. (88° C. to 93° C.). The finished material (corn) had a ASTM, 2.5 Cup Ton Flow of 18.6 seconds, a free moisture of 2.2% and a filler content of 27.7%.

Portions of this corn were ground in laboratory Ball Mills for four hours according to the formulations as given in Table 7, and tested as given in Table 8.

TABLE 7

| Example No. | C5 | 6 | 7 | 8 |
| --- | --- | --- | --- | --- |
| Paraformaldehyde[1] | 0% | 2.6% | 2.6% | 2.6% |
| Urea[1] | 0% | 3.9% | 3.9% | 3.9% |
| Zinc Stearate[1] | 0.2% | 0.2% | 0.2% | 0.2% |
| Tetrachlorophthalic[1] Anhydride | 0% | 0% | 0.025% | 0.1% |
| Hexamethylenetetramine | 0.1% | 0.1% | 0.1% | 0.1% |

[1]Quantities given in weight percents based on the weight of corn.

TABLE 8
(Refer To Footnotes For Table 4)

| Example No. | C5 | 6 | 7 | 8. |
| --- | --- | --- | --- | --- |
| Minimum Torque | 2240 | 1625 | 1810 | 1950 |
| Total Processing Time | 12.4 | 15.8 | 13.6 | 6.5 |
| Plastic Life | | | | |
| 0 min. at 240° F. | 27 | 30 | 24 | 23 |
| 5 min. at 240° F. | 12 | 35 | 21 | 19 |
| 10 min. at 240° F. | — | 29 | 11 | 0 |
| 15 min. at 240° F. | 13 | 19 | 5 | 0 |

Another quantity of corn was made of semi-works equipment following the same procedures as for Examples 5-8 including the proportions shown in Tables 5 and 6. The finished material (corn) had an ASTM, 5.0 Ton flow of 5.8 and a free moisture of 1.8%.

Portions of this corn were ground in laboratory ball mills for four hours according to the formulations as given in Table 9 and tested as given in Table 10.

TABLE 9

| Example No. | C9 | 10 | C11 | C12 | 13 | 14 |
| --- | --- | --- | --- | --- | --- | --- |
| Paraformaldehyde | 0% | 2.6% | 2.6% | 0% | 2.6% | 2.6% |
| Urea[1] | 0% | 3.9% | 0% | 3.9% | 3.9% | 3.9% |
| Zinc Stearate[1] | 0.4% | 0.4% | 0.4% | 0.4% | 0.4% | 0.4% |
| Tetra Chloro-Phthalic Anhydride[1] | 0% | 0% | 0% | 0% | 0% | 0.075% |
| Zinc Sulfate[1,2] | 0% | 0% | 0% | 0% | 0.6% | 0% |
| Hexamethylenetetramine | 0.25% | 0.25% | 0.25% | 0.25% | 1.0% | 0.25% |

[1]Quantities given in weight percents based on the weight of corn.
[2]Crystals as the monohydrate.

TABLE 10

| Example No. | C9 | 10 | C11 | C12 | 13 | 14 |
| --- | --- | --- | --- | --- | --- | --- |
| Minimum Torque[1] | 2333 | 1548 | 1990 | 1653 | 1630 | 1565 |
| Total Processing Time[1] | 14.6 | 17.3 | 18.4 | 15.6 | 8.3 | 10.1 |
| Plastic Life (in inches)[1] | | | | | | |
| 0 min. at 240° F. (115.6° C.) | 31 | 39 | 39 | 40 | 29 | 31 |
| 5 min. at 240° F. | 20 | 29 | 29 | 41 | 23 | 15 |
| 10 min. at 240° F. | 15 | 23 | 25 | 35 | 14 | 1 |
| 15 min. at 240° F. | 15 | 23 | 19 | 27 | 0 | 0 |
| Hardness[1] | 0 | 0 | 0 | 0 | 53 | 23 |
| % Product Retained on U.S. No. 40 Sieve | 1.7 | 3.7 | 2.8 | 7.6 | 1.4 | 3.4 |

[1]See notes to Table 4 for explanation of tests.

The results for Example 13 represent a good combination of low minimum torque, long plastic life at 240° F. and sufficient hardness of the final molded compound. Example 14, wherein a different catalyst system was employed, gave poorer results in plastic life and hardness, but could be a satisfactory cold runner molding compound at lower (and more stringently controlled) manifold temperature and possibly longer cycle times.

The plastic life test was additionally run on Examples 13 and 14 at 200° F. (93.3° C.) to show the life at the lower temperature, with results given in Table 11.

TABLE 11

| Example No. | 13 | 14 |
|---|---|---|
| Plastic Life (in inches)[1] | | |
| 0 min. at 200° F. (93.3° C.) | 31 | 35 |
| 5 min. at 200° F. | 29 | 28 |
| 10 min. at 200° F. | 21 | 27 |
| 15 min. at 200° F. | 19 | 23 |

[1]See notes to Table 4 for explanation of tests.

EXAMPLE 15

A larger quantity of corn was manufactured in semi-works equipment. The resin was made according to the information given in Table 12. This resin was mixed in a mixer with other ingredients according to the information given in Table 13.

TABLE 12

| Formalin[1] | 157 | Pounds (58.6 kg) |
|---|---|---|
| Urea | 106 | Pounds (39.6 kg) |
| Hexamethylenetetramine | 900 | Grams |
| Water | 11 | Pounds (4.1 kg) |
| Lactic Acid, 20% | 66 | Milliliters |

[1]52% Formaldehyde

TABLE 13

| Resin, from Table 12 | 37.6 | Pounds (14 kg) |
|---|---|---|
| Pulp[1] | 8.6 | Pounds (3.2 kg) |
| Glycerol Monostearate | 145 | Grams |
| Triethanolamine Solution, 20%[2] | 14 | Milliliters |

[1]Hammermilled alpha-cellulose pulp containing about 7% free moisture.
[2]This quantity can vary as needed to maintain a pH of the wet-mix between 7.2–7.5

The resin as formulated in Table 12 was reacted in an agitated vessel which contained coils for heating or cooling at a temperature of 58° C.±1° C. until a minimum of 1.36 mols of formaldehyde reacted as determined by measuring the percent free formaldehyde. This resin was then mixed with other ingredients as indicated in Table 13. Sufficient triethanolamine solution was added to adjust the pH of the wet-mix to 7.2–7.5. The wet material was dried on a continuous belt dryer at 190° to 200° F. (88° to 93° C.). The finished corn had an ASTM, 5 ton flow in the range of 8 to 11 seconds and a percent free moisture in the range of 1.2 to 1.9.

A number of batches of material were made in a semi-works ball mill according to the formulation given in Table 14 by grinding the ingredients together for four hours.

These batches were then granulated in a semi-works two roll mill combining mill system, yielding the product as identified in Table 15.

TABLE 14

| Corn, Table 13 | 150 | Pounds (56 kg) |
|---|---|---|
| Hexamethylenetetramine | 1% | (Based on Corn) |
| Zinc Sulfate | 0.6% | (Based on Corn) |
| Zinc Stearate | 0.4% | (Based on Corn) |
| paraformaldehyde | 2.6% | (Based on Corn) |
| Urea | 3.9% | (Based on Corn) |
| Pigment | As | required |

TABLE 15

| ASTM Flow, 2.5 Ton[1] | 5.9 |
|---|---|
| Bulk Density[2] | 69.3 |
| Minimum Torque[1] | 1625 |
| Total Processing Time[1] | 8.1 |
| Plastic Life (in inches)[1] | |
| 0 min. at 200° F. (93.3° C.) | 24.5 |
| 5 min. at 200° F. | 23.5 |
| 10 min. at 200° F. | 22.5 |
| 15 min. at 200° F. | 20.5 |
| Hardness[1] | 57 |

[1]See notes to Table 4 for explanation of tests.
[2]Grams of granular product per 100 cc of volume.

The material identified by Table 15 was molded in a 300 ton, inline injection machine equipped with a 12 cavity mold having a temperature controlled sprue and runner system. Shot size was approximately 195 grams. Material remaining in the sprue and runner system at any one time was approximately 130 grams. Typical mold and machine conditions are given in Table 16. Good parts were produced over a seven hour period without any problems with material setting-up or curing in the barrel of the injection machine or the runners or sprues. Normal machine molding operations resumed after cycle delays of 3 and 6 minutes.

Good parts were still produced when the cure time was reduced to forty seconds (all other conditions remaining the same).

TABLE 16

| Temperatures, | |
|---|---|
| Moveable Mold | 310–320° F. (154–160° C.) |
| Stationary Mold | 300–313 (149–156° C.) |
| Manifold | 210–212 (99–100° C.) |
| Nozzle & Front Zone (Surface) | 180 (82.2° C.) |
| Rear Zone (Surface) | 170 (76.7° C.) |
| Screw Back Pressure On Material | 1000 psi (6.9 megapascals) |
| Screw rpm | 38.6 |
| Stock Temperature | 200° F. (93.3° C.) |
| Primary Pressure On Material | 11,000 psi (76 megapascals) |
| Secondary Pressure On Material | 7,000 (48 megapascals) |
| Clamp Force | 300 tons (27 × 1010 dynes) |
| Injection Time | 6.6 seconds |
| Cure Time | 64 seconds |
| Injection Hold Timer | 15 seconds |

What is claimed is:

1. In a method of forming a urea molding compound wherein a cellulosic filler is impregnated with an aqueous urea-formaldehyde prepolymer, condensate, resin or monomer, impregnated material is dried to form a corn and the corn is ground or mixed in combination with a lubricant and a catalyst system, the improvement which comprises combining urea and paraformaldehyde with the corn before or during grinding or mixing in quantities sufficient to lower the viscosity of the molding compound to a viscosity where the molding compound can be injected at an injection temperature of about 82° to 110° C. with an applied pressure of about 125 megapascals or less.

2. The method of claim 1 wherein the corn is ground to form a powder and subsequently densified.

3. The method of claim 1 wherein the corn is ground to form a powder and subsequently densified and granulated.

4. The method of claim 1 wherein the cellulosic filler is alpha cellulose.

5. The method of claim 1 wherein urea and paraformaldehyde are combined with the corn in quantities sufficient to lower the viscosity of the molding compound to a viscosity where the molding compound can be injected at an injection temperature of about 82° to 110° C. with an applied pressure of about 70–100 megapascals.

6. The method of claim 1 wherein between about 2% and about 6% paraformaldehyde and between about 3% and about 8% urea, both by weight of corn, are combined with the corn.

7. The method of claim 1 wherein the catalyst system includes about 0.2% to 2% zinc sulfate and about 0.1% to 2.0% hexamethylenetetramine, by weight of corn.

8. The method of claim 1 wherein the pH of the resin is between about 7.2 and about 7.5 during drying.

9. A urea molding compound prepared by the method of claim 1, claim 2, claim 4, claim 5, claim 6, claim 7 or claim 8.

10. A granular urea molding compound prepared by the method of claim 3.

* * * * *